United States Patent
Inoue

(10) Patent No.: US 7,958,020 B2
(45) Date of Patent: Jun. 7, 2011

(54) EFFICIENT INVENTORY MANAGEMENT FOR PROVIDING DISTINCT SERVICE QUALITIES FOR MULTIPLE DEMAND GROUPS

(75) Inventor: Keisuke Inoue, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/614,590

(22) Filed: Nov. 9, 2009

(65) Prior Publication Data

US 2011/0112938 A1    May 12, 2011

(51) Int. Cl.
*G06Q 10/00* (2006.01)
(52) U.S. Cl. ......................................... 705/28
(58) Field of Classification Search .............. 705/28
See application file for complete search history.

(56) References Cited

U.S. PATENT DOCUMENTS

| | | | | |
|---|---|---|---|---|
| 6,609,101 | B1 * | 8/2003 | Landvater | 705/10 |
| 7,249,068 | B1 * | 7/2007 | Kakouros et al. | 705/28 |
| 2003/0014299 | A1 * | 1/2003 | Hoffman | 705/10 |
| 2006/0041463 | A1 * | 2/2006 | Yoshida et al. | 705/10 |

FOREIGN PATENT DOCUMENTS

| | | |
|---|---|---|
| JP | 2000053218 | 2/2000 |
| JP | 2002012308 | 1/2002 |
| JP | 2005029368 A | 2/2005 |
| JP | 2007018023 A | 1/2007 |
| JP | 2007128225 A | 5/2007 |

\* cited by examiner

*Primary Examiner* — F. Ryan Zeender
*Assistant Examiner* — Fateh M Obaid
(74) *Attorney, Agent, or Firm* — Law Offices of Ira D. Blecker, P.C.

(57) ABSTRACT

An inventory management method for managing an inventory of goods for a plurality of demand groups with each demand group having at least one service quality, the method includes determining a total safety stock level for the plurality of demand groups that satisfies the distinct service quality of each demand group, determining a shipment limit $Z_i$ for each demand group $G_i$, wherein goods are shipped for a demand group $G_i$ only if the inventory of goods for the demand group $G_i$ exceeds the shipment limit $Z_i$. Also disclosed is a computer program product and a method for an inventory management service.

13 Claims, 4 Drawing Sheets

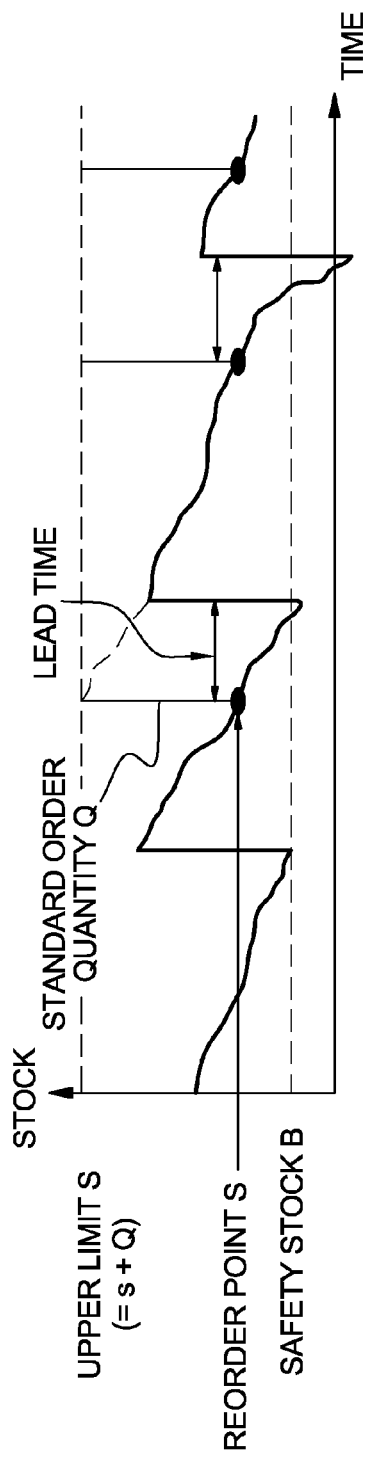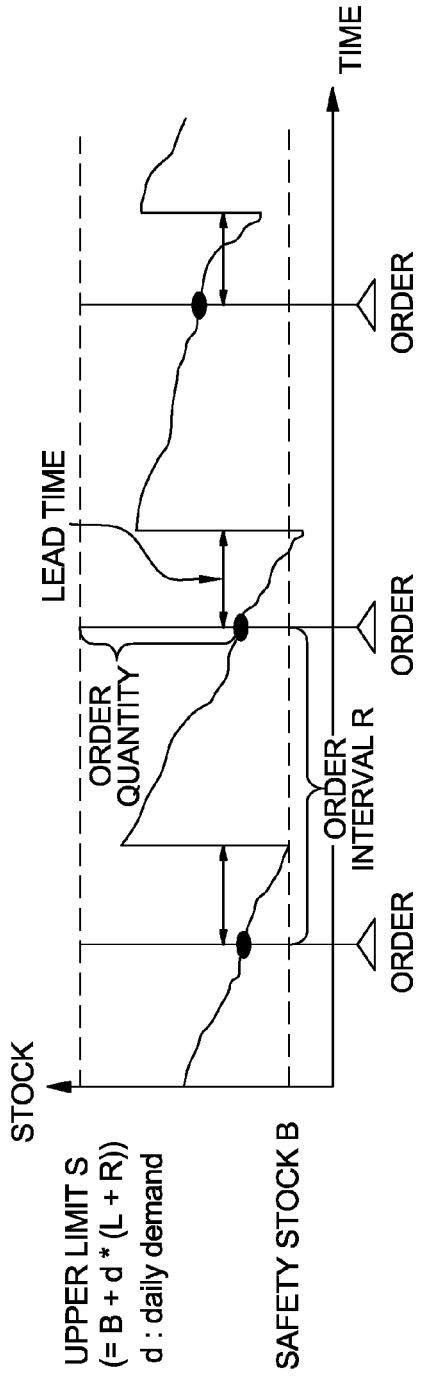

EFFICIENT INVENTORY MANAGEMENT FOR PROVIDING DISTINCT SERVICE QUALITIES FOR MULTIPLE DEMAND GROUPS

BACKGROUND OF THE INVENTION

The present invention relates to inventory management methods and, more particularly, relates to an inventory management method that provides distinct service qualities for multiple demand groups.

Make-to-stock production is a method to respond to forecast error, that is, the gap between demand and forecast, by having safety stock. It is an important issue for inventory management to balance the contradictory requirements of minimizing stock and maximizing customer service. In other words, to ensure that enough goods are available to be shipped out from a warehouse to meet a customer deadline, the volume of stock held is likely to increase, resulting in a consequent increase in capital cost, and risks such as obsolescence leading to the disposal of goods. On the other hand, to simply decrease stock levels can lead to a decline in service quality. Therefore, in order to harmonize the balance between stock volume and service quality, various approaches have been applied, such as optimizing parameters for the replenishment of stock, or improving the accuracy of demand forecasts.

Although the phrase "service quality" is often used, there is no commonly agreed definition in use. The level of service to be achieved will vary according to the nature of the product and in response to a wide variety of factors and demands, for example, classification of customers, lead times, delivery dates, quantity and order size, to name but a few. If all these factors can be successfully dealt with, then there is the distinct possibility of both improving service quality and decreasing stock levels. However, methods that are generally used for inventory management, such as ordering point or periodic replenishment systems respond to all incoming demands equally, whatever demand has been made in terms of the above mentioned factors. When service quality needs to be differentiated in response to distinct classes of demands, two methods have been proposed. One of these methods is that stock may be completely separated according to distinct service qualities and the other method is that for all demands, the strictest service quality criteria is applied across the board.

BRIEF SUMMARY OF THE INVENTION

The present invention solves the problem of satisfying requirements in an inventory management system that has been designed to meet required service qualities in response to variations in demand by providing safety stock levels when there are multiple demand groups with distinct service qualities.

In responding to variable demands for inventory, the method proposed by the present invention enables a more precise response by the grouping of demands based on service quality. The proposed method has a great advantage in terms of lower safety stock levels. In addition, average inventory levels are also lower when employing the proposed method.

When service qualities are differentiated according to types of customers and demands, especially if consideration is given to extremely urgent or important cases, the methods proposed by this invention will greatly contribute to the improvement in business efficiency.

The various advantages and purposes of the present invention as described above and hereafter are achieved by providing, according to a first aspect of the invention, an inventory management method for managing an inventory of goods for a plurality of demand groups with each demand group having at least one service quality, the method including a computer processor coupled to a memory for performing the steps of the method. The method includes arranging demand groups in an order according to a service quality, determining parameters to be applied based on the demand group order, and determining an order placement of the goods and a shipment of the goods based on a shipment limit of each demand group.

According to a second aspect of the invention, there is provided a computer program product for managing an inventory of goods for a plurality of demand groups with each demand group having a service quality including a computer readable storage medium having computer readable program code embodied therewith, the computer readable program code including computer readable program code configured to arrange demand groups in an order according to a service quality, computer readable program code configured to determine parameters to be applied based on the demand group order, and computer readable program code configured to determine an order placement of the goods and a shipment of the goods based on a shipment limit of each demand group.

According to a third aspect of the invention, there is provided a method for an inventory management service provided to a user for managing an inventory of goods for a plurality of demand groups with each demand group having at least one service quality, the method including a computer processor coupled to a memory for performing the steps of the method. The method includes inputting a plurality of demand groups responsive to demand group information provided by a user with each demand group having at least one service quality, arranging demand groups in an order according to a service quality, determining parameters to be applied based on the demand group order, and determining an order placement of the goods and a shipment of the goods based on a shipment limit of each demand group.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjunction with the accompanying drawings in which:

FIG. 1 is an illustration of the reorder point system.

FIG. 2 is an illustration of the periodic replenishment system.

DETAILED DESCRIPTION OF THE INVENTION

Figure 3:
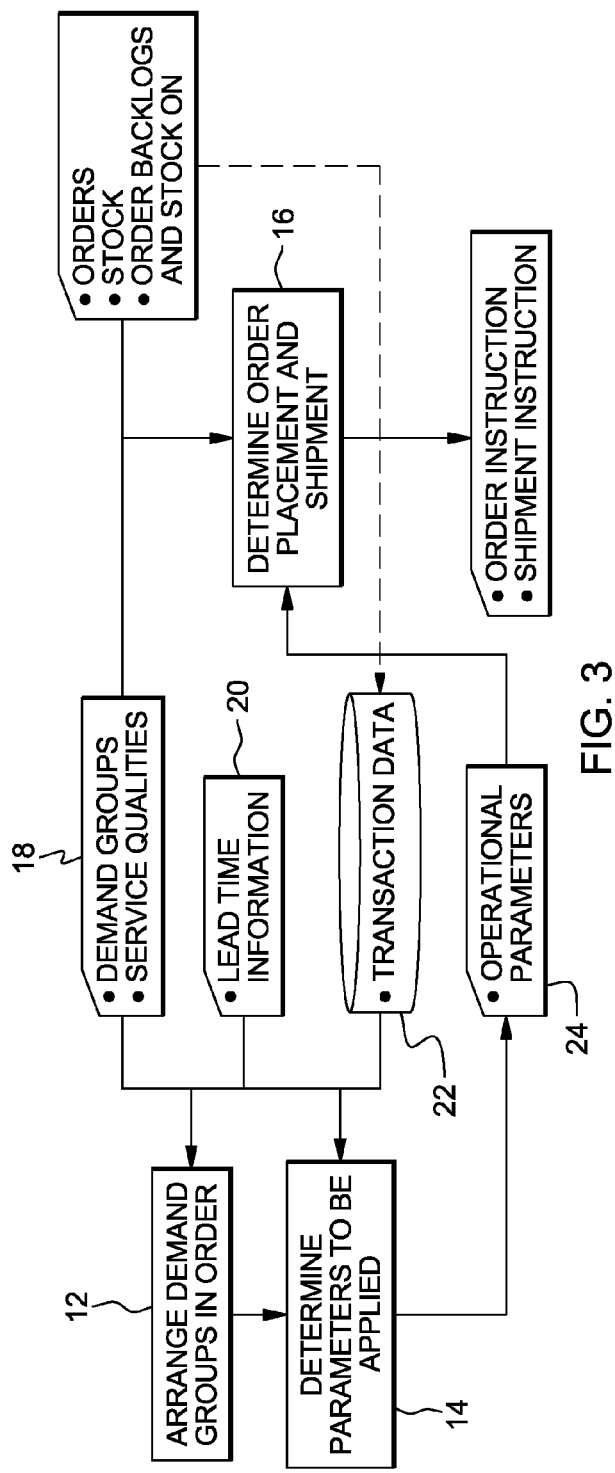
FIG. 3 is a flow chart of an embodiment of the present invention.

The following definitions may be useful in understanding the present invention.

"Demand group" refers to a demand group that has been classified according to such attributes for each demand as customer classification, order quantity per time or requested lead time. The number of attributes may be one or multiple. It is assumed that there are two or more demand groups. In addition, division of all demands into demand groups must be exclusive and comprehensive. In other words, each demand group, as a set of demands, cannot overlap another demand group and that there should not be a demand that belongs to no demand group. This rule is applied to both past demands and future demands.

"Safety stock" (sometimes also called "Buffer Stock") refers to a minimum level of inventory that is held as a protection against shortages due to fluctuations in demand. In order to calculate the safety stock needed to achieve a uniform service quality for all demands that belong to one or multiple demand groups, it is assumed that the following data may be provided:

1) Replenishment lead times and its fluctuation. In general, the data should be the probability distribution of replenishment lead times, and typically, expected values of replenishment lead times and standard deviation are often used.
2) Past sales order (or shipment) transaction data. This data is a collection of records for a fixed period of time including date, quantity, requested lead time, customer name, and customer ranking. The last three items are examples of attributes that may be used for determining a demand group. By reading the transaction data, the trends of changes in demands, as well as a demand distribution can be understood; therefore, based on the data safety stock may be calculated.
3) Forecast of future demands for each group and accuracy of the forecast (fluctuation). Safety stock can be calculated based on the distribution of forecast error, which is a gap between actual sales and forecast of the demand over replenishment lead time.

Both 2) and 3) are examples of data that may be used for estimating a future demand distribution, but both types of data are not necessarily needed at the same time. Moreover, in some cases safety stock may be calculated based on data other than these types of data.

Safety stock may be calculated by well known equations in the prior art. One method of calculating safety stock, for purposes of illustration and not limitation, is as follows;

Safety stock=$k$*SQRT(Avg. Lead Time*Standard Deviation of Demand+Av. Demand$^2$*Standard Deviation of Lead Time$^2$) where k=service factor (the service factor is used to calculate a specific quantity to meet the specified service level)

"Service quality" is a combination of some kind of service level metric and a numerical target. Typical examples of service level metrics are the fill rate, the on-time delivery ratio as to customer lead time (the number of days specified), and the order cycle service level (probability of no stockout at the end of an order cycle): for example, a 99% fill rate, or a 90% on-time delivery ratio with 10-day lead time. There is a service quality allocated to each demand group.

Present inventory management methods such as the reorder point system ((s,S) method, (s,Q) method) and the periodic replenishment system ((R,S) method) contemplate that safety stock for a uniform service quality can be calculated. The reorder point system is illustrated in FIG. 1 and the periodic replenishment system is illustrated in FIG. 2. The present invention may be used in conjunction with inventory management methods such as the reorder point system and the periodic replenishment system.

Referring now to FIG. 3, one embodiment of the present invention is illustrated. The method according to the present invention includes three sections: 1) a section, block 12, that arranges demand groups in order; 2) a section, block 14, that determines parameters to be applied; and 3) a section, block 16, that decides order placement and shipment of goods from a warehouse. Each of these sections will be discussed in detail below.

Section that Arranges Demand Groups in Order (12 in FIG. 3):

In the section that arranges demand groups in order, block 12, demand groups and service quality for each demand group are defined, block 18. By making use of demand log data, demand forecasts made in the past, and lead time information, block 22, demand groups are rearranged in order of service quality, loose to strict (smallest to largest safety stock), according to the following procedure.

Step 1. Let a list including all demand groups be LG=($G_1$, $G_2$, ... $G_N$), and let a list including all service qualities be LS=($SL_1$, $SL_2$, ... $SL_N$). LG and LS respectively correspond to the first column and second column in Table 1, that is $SL_i$ is the service quality assigned to G. Lists LG and LS are unsorted. OG is a list with no data.

TABLE 1

| LG<br>Demand<br>group | LS<br>Service<br>quality |
|---|---|
| $G_1$ | $SL_1$ |
| $G_2$ | $SL_2$ |
| ... | ... |
| $G_N$ | $SL_N$ |

Step 2. For all the demands of the groups included in the present list LG, calculate safety stock to attain each service quality that belongs to the list LS. That is, safety stock is calculated for the same number of times as there are items in the LS. Safety stock is calculated for the total demand of demand groups in List LG against each service quality in List LS to find out which service quality can be achieved with the smallest safety stock. For example, safety stock is calculated for the total demand of demand groups $G_1$ ... $G_N$ against service quality $SL_1$, then safety stock is calculated for the total demand of demand groups $G_1$ ... $G_N$ against service quality $SL_2$, and so on. Among the results, determine a pair ($G_i$, $SL_i$) that corresponds to the smallest safety stock. This determination is made by finding the total demand of demand groups $G_1$ ... $G_N$ against service quality $SL_i$ resulting in the lowest safety stock, then from Table 1, finding the $G_i$ corresponding to the $SL_i$. For example, if the total demand of demand groups $G_1$ ... $G_N$ against service quality $SL_2$ resulted in the lowest safety stock, then the corresponding demand group would be $G_2$, resulting in the pair ($G_2$, $SL_2$) having the lowest safety stock. If multiple pairs are found, select any one pair.

Step 3. Remove $G_i$ and $SL_i$ from list LG and list LS respectively and add $G_i$ to the end of list OG.

Step 4. If the list LG is empty, the procedure is finished.

Step 5. If the list LG is not empty, meaning there are more pairs ($G_i$, $SL_i$) to consider, proceed back to Step 2 and repeat the procedure, selecting the pair ($G_i$, $SL_i$) that corresponds to the next smallest safety stock from the remaining pairs. By carrying out the above procedures, in the end a list OG including N items is obtained, and in the list, demand groups are arranged in the order of service qualities, loose to strict, wherein the order of the safety stock level is small to large.

These steps may be simplified if a common type is used as a metric of service quality. For example, when three levels of fill rate, 99%, 90%, and 75% are set, list LS is expressed in the increasing order of percentages as: LS=(fill rate 75%, fill rate 90%, and fill rate 99%). List OG is arranged so that it corresponds to list LS.

Section that Determines Parameters to be Applied (Block 14, FIG. 3):

In this section, parameters (i.e., operational parameters that are used in actual replenishment operation) to be applied are determined, block 14. These operational parameters are $B_i$, $B_{all}$ and $Z_i$ and will be discussed hereafter. Based on the above-mentioned order in List OG, the total safety stock is calculated by accumulating safety stock that will be needed for all demands for which some kind of service quality should be fulfilled In addition, for each demand group, this section calculates a shipment limit (threshold). That is, goods are shipped out from the warehouse (or allocated, i.e. reserved for shipment) within a range where the stock in hand does not fall below the shipment limit of the demand group. It is assumed that standard order quantity Q (in the reorder point system) and order interval R (in the periodic replenishment system) are given beforehand, and a reorder point and upper stock limit are derived from the total safety stock, replenishment lead time and demand forecast.

The parameters that are to be applied are determined according to the following procedure.

Step 0. To simplify, from the top of List OG reassign subscripts in the following manner: $G_1, G_2, \ldots G_N$. List OG is a list of demand groups which are sorted in increasing order of service quality of each demand group so that the service quality of the first demand group in OG (the top of List OG) is the easiest to achieve. Regarding $SL_i$, reassign subscripts so that the correspondence relation with $G_i$ (Table 1) is maintained. For example, for $SL_1$, the demand group should be renumbered to $G_1$ and for $SL_2$, the demand group should be renumbered to $G_2$, and so on. When the process of arranging (or sorting) demand groups starts, List LG and List LS are not sorted. After the above process, List LG and List LS become empty while List OG is a sorted list.

Step 1. Take $G_i$ in order from the top of OG and carry out the following procedures.
  a. For all the demands combined from $G_i$ to $G_N$, calculate safety stock corresponding to service quality $SL_i$ using conventional methods of calculating safety stock. One conventional method of calculating safety stock here may be the formula for calculating safety stock previously used.
  b. For all the demands combined from $G_i$ to $G_N$, calculate safety stock corresponding to $SL_{i-1}$ using conventional methods of calculating safety stock. (When i=1, safety stock is 0.)
  c. Determine $B_i$ (safety stock) using the expression below. Since groups are arranged in increasing order of service quality, loose to strict, $B_i \geq 0$.

$B_i$=(Safety stock corresponding to $SL_i$)−(Safety stock corresponding to $SL_{i-1}$)

Step 2. Calculate the total safety stock $B_{ALL}$ using the expression below.

$B_{ALL} = \Sigma B_i (1 \leq i \leq N)$

Step 3. Calculate the shipment limit $Z_i$ for each group $G_i$ using the expression below.

$Z_i = \Sigma B_j ((i+1) \leq j \leq N)$

Therefore, $Z_1 = B_{ALL} - B_1$, $Z_2 = B_{ALL} - B_1 - B_2$, etc. and $Z_N = 0$.

Figure 5:
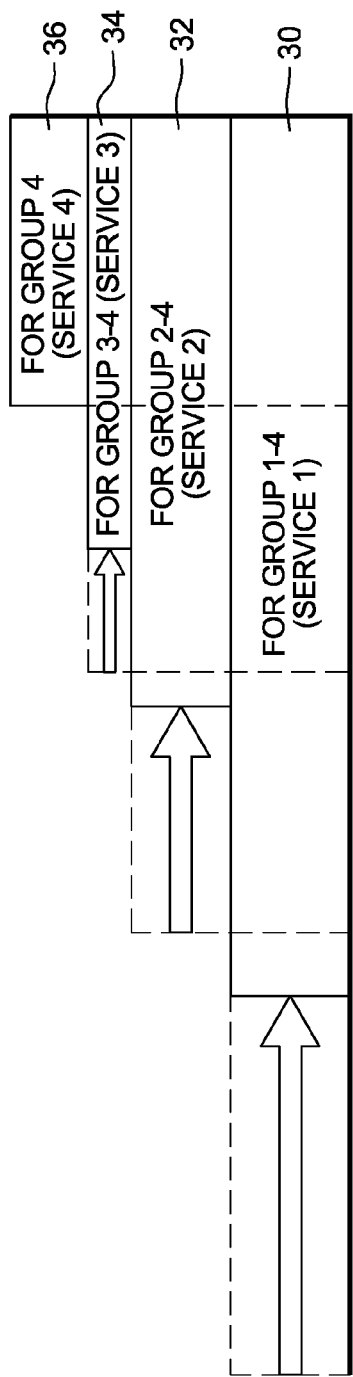
FIG. 5 is a diagram illustrating how safety stock is held according to the present invention.

Regarding $B_i$ and $B_{ALL}$ derived from the above procedures, an explanation is given below. With reference to FIG. 5, the safety stock corresponds to the area of each rectangle (solid line) 30, 32, 34, 36, and is consumed in order from the lowest layer, rectangle 30. $B_1$ is safety stock that guarantees the loosest service quality $SL_1$ for all demand groups (Groups 1 to 4 in FIG. 5), and corresponds to the area of the rectangle 30 (solid line) at the lowest layer in FIG. 5. $B_2$ is safety stock that is additionally needed to guarantee the second loosest $SL_2$ for $G_2 \ldots G_N$ (Groups 2 to 4 in FIG. 5), and corresponds to the rectangle 32 (solid line) at the second layer from the bottom. This safety stock can be used by all demand groups apart from $G_1$. $G_1$ can only use safety stock $B_1$, and it cannot consume the remaining $B_{ALL} - B_1 (=Z_1)$ even if they still remain. In other words, this restriction $Z_1$ is the shipment limit of $G_1$. The total safety stock $B_{ALL}$ is the sum of all rectangle areas 30, 32, 34, 36.

Section that Decides Order Placement and Shipment of Goods from a Warehouse (16 in FIG. 3):

In conventional logic of shipping out, if the stock in hand exceeds zero, goods are shipped out from the warehouse (or allocated) in the same way as to all demands (i.e., sales order, or request for shipment). (If the requested quantity is partially fulfilled, rules for fulfilling partial quantities are followed.)

The proposed method first determines to which demand group a new demand (a request for shipment) belongs, and if the stock in hand exceeds the shipment limit set for such group, shipment (allocating) is carried out. In other words, for the demand groups to which a loose service quality is assigned, goods may not be shipped out even if they are in stock. The lower the ranking order in List OG (i.e., towards more strict service quality), the service quality to be fulfilled becomes stricter and the threshold, $Z_i$ becomes smaller; therefore, the possibility of shipment (allocating) increases.

This section may be used with the reorder point system ((s,S) method, (s,Q) method) illustrated in FIG. 1 and the periodic replenishment system ((R,S) method) illustrated in FIG. 2. First, in the reorder point system, as described previously the standard order quantity is given in advance; therefore, based on the total safety stock $B_{ALL}$, which was determined above, s, the ordering point is found using the expression (1) below, and an upper limit S, which is usually called order-up-to-level, is found using the expression (2) below. Here, replenishment lead time is expressed by L.

$s = B_{ALL}$+(Demand forecast until $L$ has elapsed)  (1)

$S = s + Q$  (2)

In the periodic replenishment system, an upper limit S is found using the expression below.

$S = B_{ALL}$+(Demand forecast until $(L+R)$ has elapsed)

The point that is different from the conventional methods is the calculation for shipment (allocating). Concerning a new demand (sales order and request for shipment), the calculation is made not only by checking the stock in hand, but also by assessing Group $G_i$ to which the relevant demand belongs. If the stock in hand exceeds the threshold (shipment limit) $Z_i$ of the relevant Group $G_i$, goods are shipped out (allocated). In the case where only a part of the ordered quantity can be provided, that part of the goods is shipped out in accordance with the prescribed method, and/or the amount of shortage (or all) is recorded in the backlog of orders.

For example, when stock in hand is 100 items, if an order for 20 has been made and the shipment limit of the relevant demand group is 100, the goods cannot be shipped out, and if the limit is 60, it is assessed that all of the 20 can be shipped out. Or if the shipment limit is 90 and a policy that permits partial shipment is applied, 10 items will be shipped out.

Concerning the decision for shipment it should be noted that the demand of $G_i$ which was recorded in the backlog of orders will be satisfied (goods will be shipped out) immediately after the stock in hand exceeds $Z_i$.

This section describes preferred embodiments of the present invention.

First Embodiment

Suppose that the probability of no stockout at the cycle end is set for each customer classes. Stockout refers to running out of the inventory of an item.

Customers may be rated according to their degree of priority, such as platinum, gold and silver customers and a distinct service level (i.e., probability of no stockout) is assigned for each customer group. For example, different percentages of order cycle service level are given for each group, such as 99%, 90%, and 75%. Assuming the replenishment lead time is 5 days, and its standard deviation is 0 day (no fluctuation), the mean value of daily demands and coefficient of variation (COV) are set as shown in Table 2.

Figure 4:
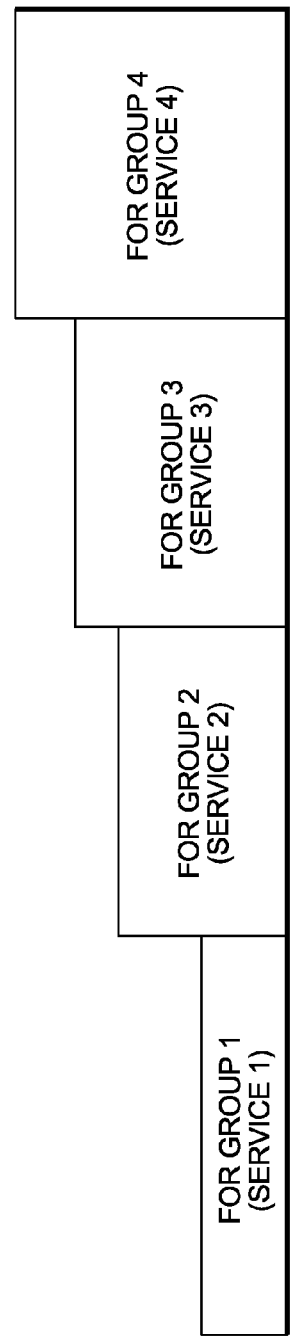
FIG. 4 is a diagram illustrating how separate safety stock is held for each demand group.
Figure 6:
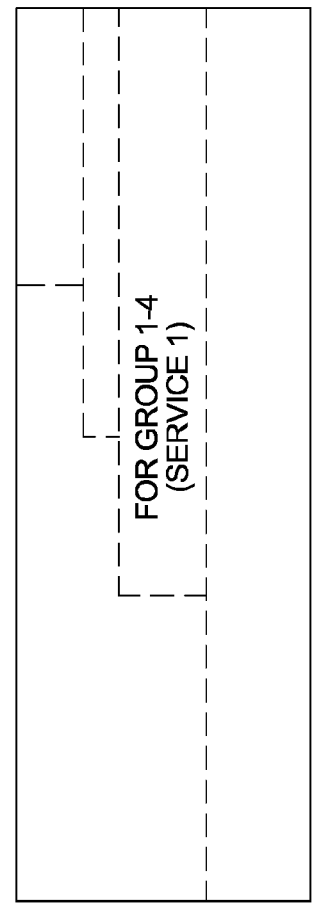
FIG. 6 is a diagram illustrating how safety stock is held when the strictest service quality is applied to all demand groups.

For comparison, safety stock is first calculated employing a conventional method. In the case where separate stock is held for each demand group (FIG. 4), or where the strictest service level is applied to all demands (FIG. 6), safety stock is 993.5 and 1560.6 respectively as underlined at the lower right of Table 2 (it is assumed that the demand by each group is independent and demands during lead time follows a normal distribution).

TABLE 2

| | Probability of no stockout at cycle end | Daily demand (items) | Coefficient of variance (COV) | Standard deviation of demand (σ) during lead time (items) | Safety stock for separate stock (items) (FIG. 4) | Safety stock for strictest service level (items) (FIG. 6) |
|---|---|---|---|---|---|---|
| G1 (Silver) | 75% | 300 | 0.91 | 612.4 | 413.0 | |
| G2 (Gold) | 90% | 50 | 2.24 | 250.0 | 320.4 | |
| G3 (Platinum) | 99% | 10 | 5.00 | 111.8 | 260.1 | |
| Total | | 360 | | 670.8 | 993.5 | 1560.6 |

In the case where the method proposed by this invention is applied (FIG. 5), according to the calculation results as shown in Table 3, safety stock is 735.5. When compared with the two methods mentioned above, this figure is about 75% of the smaller result (993.5), indicating the possibility of holding a smaller quantity of stock. When compared with the case shown in FIG. 4, the proposed method reduces safety stock by the quantities indicated by the arrows in FIG. 5.

TABLE 3

| | Daily demand (items) | Standard deviation of demand σ during lead time (items) | Safety stock 1 (items) | Safety stock 2 (items) | Safety stock by the invention (items) |
|---|---|---|---|---|---|
| G1 + G2 + G3 | 360 | 670.8 | 452.5 | 0.0 | 452.5 |
| G2 + G3 | 60 | 273.9 | 351.0 | 184.7 | 166.3 |
| G3 | 10 | 111.8 | 260.1 | 143.3 | 116.8 |
| Total | | | | | 735.5 |

Second Embodiment

When service quality is differentiated according to order quantity per orderline.

There are some cases where as much as possible, a stockout should be avoided except for large-quantity orders. That is, a stockout is to be avoided for a small order for 1 or 2 items concerned with repair parts. If such an urgent order cannot be fulfilled immediately, the customer who made the order will experience difficulties. Or if an order for a large quantity is completely fulfilled, this may cause a subsequent shortage of goods for other customers and give a negative impact on the fill rate based on the number of orders. In such a case, after grouping orders according to the quantity per order, a higher service level can be allocated to a group with a lower quantity (e.g. 1 to 3 items).

Or, if one order is divided and put into different demand groups, a portion of the items ordered can be shipped out.

Third Embodiment

When the service quality is differentiated according to the length of a requested customer lead time.

There is a case where the requested lead time is separately specified for each order. In this case, generally, when safety stock is calculated with the average of requested lead time K and a standard deviation $\sigma_K$, (L−K) can be used instead of the replenishment lead time L. Regarding fluctuation (standard deviation), $\sqrt{(\sigma_L^2+\sigma_K^2)}$ is derived from the additivity of variance, and used instead of lead time fluctuation $\sigma_L$. When safety stock is calculated using these methods, and is allocated in accordance with order acceptance timing, and goods removed from stock in hand although they are not shipped out immediately, service quality for the requested lead time can be achieved; however.

Requested lead times for each order will vary, for example, demands can be divided into the following demand groups: prompt delivery; 1 to 5-day requested lead time; 6 to 15-day requested lead time; and 17-day or more requested lead time. Each service level metric is assumed to be the fill rate, on-time delivery ratio (for 1 to 5 days), on-time delivery ratio (for 6 to 15 days), and on-time delivery ratio (for 16 days or more), and 90%, 95%, 95%, 90% are assigned respectively. As described above, by replacing the lead time and fluctuation, safety stock can be calculated; therefore, this method enables arranging demand groups in order, resulting in the achievement of respective service quality.

Fourth Embodiment

Complex Grouping

The method for grouping demands is not restricted to the above-mentioned patterns. Demands may be divided using another attribute or multidimensionally divided using multiple attributes. The important point is that grouping is exclusive and comprehensive, and service quality is set for each group.

Figure 7:
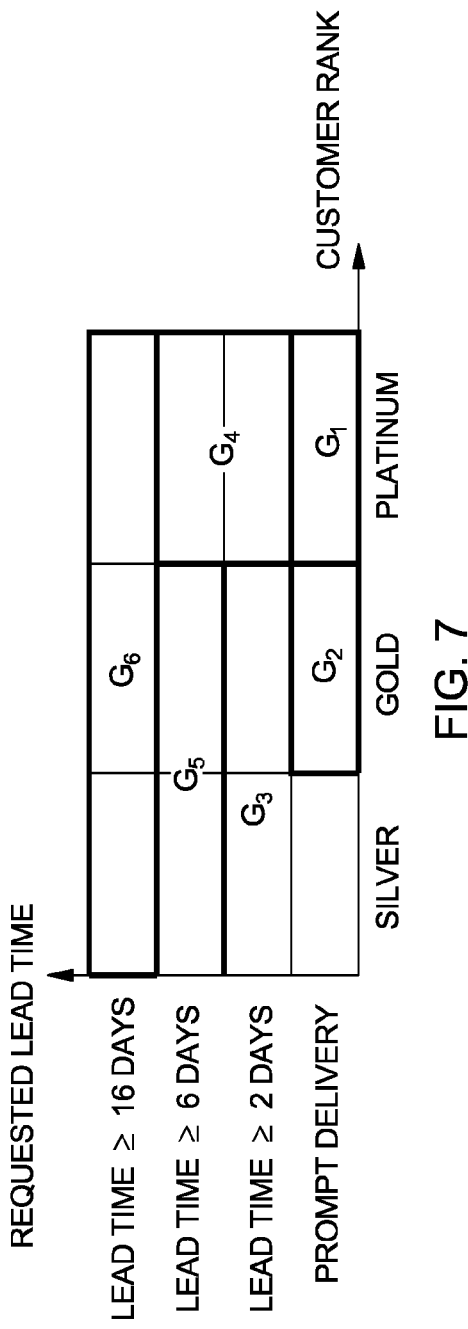
FIG. 7 is a diagram illustrating grouping of demands.

For example, grouping of demands can be made based on a direct product of 2 attributes, customer ranking and requested lead time. In this case, as shown in FIG. 7, one group may be created by merging several cells.

Figure 8:
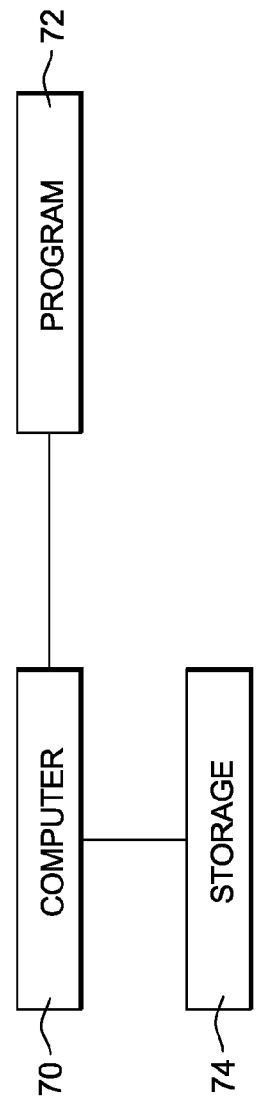
FIG. 8 is an illustration of an exemplary hardware embodiment of the present invention.

FIG. 8 is a block diagram that illustrates an exemplary hardware environment of the present invention. The present invention is typically implemented using a computer 70 comprised of microprocessor means, random access memory (RAM), read-only memory (ROM) and other components. The computer may be a personal computer, mainframe computer or other computing device. Resident in the computer 70, or peripheral to it, will be a storage device 74 of some type such as a hard disk drive, floppy disk drive, CD-ROM drive, tape drive or other storage device.

Generally speaking, the software implementation of the present invention, program 72 in FIG. 8, is tangibly embodied in a computer-readable medium such as one of the storage devices 74 mentioned above. The program 72 comprises instructions which, when read and executed by the microprocessor of the computer 70 causes the computer 70 to perform the steps necessary to execute the steps or elements of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above in with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

I claim:

1. An inventory management method for managing an inventory of goods for a plurality of demand groups with each demand group having at least one service quality, the method comprising:
a computer processor coupled to a memory for performing the following steps:
(a) arranging demand groups in an order according to a service quality;
(b) determining parameters to be applied based on the demand group order comprising:
(i) calculating for a total demand of demand groups $G_i$ to $G_N$ a safety stock corresponding to service quality $SL_i$;
(ii) calculating for a total demand of demand groups $G_i$ to $G_N$ a safety stock corresponding to service quality $SL_{i-1}$;
(iii) determining a safety stock $B_i$ according to the formula:

$B_i$=Safety stock corresponding to service quality $SL_i$–safety stock corresponding to service quality $SL_{i-1}$;

(iv) repeating steps (i) to (iii) for $1 \leq i \leq N$;
(v) determining a total safety stock for all demand groups for all service qualities according to the formula:

$B_{ALL} = \Sigma B_i (1 \leq i \leq N)$; and (vi) determining a shipment limit, $Z_i$, for each group $G_L$ for $1 \leq i \leq N$ wherein $Z_i = \Sigma B_j ((i+1) \leq j \leq N)$ where $B_j$ is (safety stock corresponding to service quality $SL_j$)–(safety stock corresponding $SL_{j-1}$) and $i$= 1 to $N$; and (c) determining an order placement of the goods and a shipment of the goods based on a shipment limit of each demand group.

2. The inventory management method of claim 1 wherein (a) comprises:
(i) listing all demand groups into a list LG and listing all service qualities into a list LS so that each demand group has a corresponding service quality;
(ii) determining a safety stock for a total demand of all demand groups in List LG against each service quality in List LS;
(iii) choosing a demand group and corresponding service quality having the smallest safety stock;
(iv) removing the demand group and corresponding service quality having the smallest safety stock from the list LG and list LS, respectively, and placing the demand group in a new list OG;
(v) repeating steps (ii), (iii) and (iv) until all demand groups have been chosen and placed in the list OG such that the list OG lists demand groups from smallest safety stock to largest safety stock.

3. The inventory management method of claim 1 wherein (c) comprises:
(i) receiving a new demand;
(ii) determining to which demand group the new demand belongs;
(iii) determining a shipment limit, $Z_i$, for each demand group $G_i$ for $1 \leq i \leq N$; and
(iv) shipping goods if goods in stock exceed the shipment limit, $Z_i$.

4. The inventory management of claim 3 wherein $Z_i = \Sigma B_j ((i+1) \leq j \leq N)$ where $B_j$ is (safety stock corresponding to service quality $SL_j$)–(safety stock corresponding to service quality $SL_{j-1}$) and $i$=1 to $N$.

5. An inventory management method for managing an inventory of goods for a plurality of demand groups with each demand group having at least one service quality, the method comprising:
a computer processor coupled to a memory for performing the following steps:
(a) arranging demand groups in an order according to a service quality comprising:
(i) listing all demand groups into a list LG and listing all service qualities into a list LS so that each demand group has a corresponding service quality;
(ii) determining a safety stock for a total demand of all demand groups in List LG against each service quality in List LS;
(iii) choosing a demand group and corresponding service quality having the smallest safety stock;
(iv) removing the demand group and corresponding service quality having the smallest safety stock from the list LG and list LS, respectively, and placing the demand group in a new list OG;
(v) repeating steps (ii), (iii) and (iv) until all demand groups have been chosen and placed in the list OG such that the list OG lists demand groups from smallest safety stock to largest safety stock;
(b) determining parameters to be applied based on the demand group order comprising:
(i) calculating for a total demand of demand groups $G_i$ to $G_N$ a safety stock corresponding to service quality $SL_i$;
(ii) calculating for a total demand of demand groups $G_i$ to $G_N$ a safety stock corresponding to service quality $SL_{i-1}$;
(iii) determining a safety stock $Bi$ according to the formula:

$Bi$=Safety stock corresponding to service quality $SL_i$–safety stock corresponding to service quality $SL_{i-1}$;

(iv) repeating steps (i) to (iii) for $1 \leq i \leq N$;
(v) determining a total safety stock for all demand groups for all service qualities according to the formula:

$B_{ALL} = \Sigma B_i (1 \leq i \leq N)$; and (vi) determining a shipment limit, $Z_i$, for each group $G_i$ for $1 \leq i \leq N$; and
(c) determining an order placement of the goods and a shipment of the goods based on a shipment limit of each demand group comprising:
  (i) receiving a new demand;
  (ii) determining to which demand group the new demand belongs;
  (iii) determining a shipment limit, Zi, for each demand group Gi for $1 \leq i \leq N$; and
  (iv) shipping goods if goods in stock exceed the shipment limit, $Z_i$.

6. A computer program product for managing an inventory of goods for a plurality of demand groups with each demand group having a service quality comprising:
a computer readable storage medium having computer readable program code embodied therewith, the computer readable program code comprising:
(a) computer readable program code configured to arrange demand groups in an order according to a service quality;
(b) computer readable program code configured to determine parameters to be applied based on the demand group order comprising:
  (i) computer readable program code configured to calculate for a total demand of demand groups $G_i$ to $G_N$ a safety stock corresponding to service quality $SL_i$;
  (ii) computer readable program code configured to calculate for a total demand of demand groups $G_i$ to $G_N$ a safety stock corresponding to service quality $SL_{i-1}$;
  (iii) computer readable program code configured to determine a safety stock Bi according to the formula:

$Bi$=Safety stock corresponding to service quality $SL_i$–safety stock corresponding to service quality $SL_{i-1}$;

(iv) repeating steps (i) to (iii) for $1 \leq i \leq N$;
  (v) computer readable program code configured to determine a total safety stock for all demand groups for all service qualities according to the formula:

$B_{ALL} = \Sigma B_i (1 \leq i \leq N)$; and (v) computer readable program code configured to determine a shipment limit, $Z_i$, for each group $G_i$ for $1 \leq i \leq N$ wherein $Z_i = \Sigma B_j ((i+1) \leq j \leq N)$ where $B_j$ is (safety stock corresponding to $SL_j$)–(safety stock corresponding to $SL_{j-1}$) and i=1 to N; and
(c) computer readable program code configured to determine an order placement of the goods and a shipment of the goods based on a shipment limit of each demand group.

7. The computer program product of claim 6 wherein (a) comprises:
(i) computer readable program code configured to list all demand groups into a list LG and listing all service qualities into a list LS so that each demand group has a corresponding service quality;
(ii) computer readable program code configured to determine a safety stock for a total demand of all demand groups in List LG against each service quality in List LS;
(iii) computer readable program code configured to choose a demand group and corresponding service quality having the smallest safety stock;
(iv) computer readable program code configured to remove the demand group and corresponding service quality having the smallest safety stock from the list LG and list LS, respectively, and placing the demand group in a new list OG;
(v) computer readable program code configured to repeat steps (ii), (iii) and (iv) until all demand groups have been chosen and placed in the list OG such that the list OG lists demand groups from smallest safety stock to largest safety stock.

8. The computer program product of claim 6 wherein (c) comprises:
(i) computer readable program code configured to receive a new demand;
(ii) computer readable program code configured to determine to which demand group the new demand belongs;
(iii) computer readable program code configured to determine a shipment limit, $Z_i$, for each demand group Gi for $1 \leq i \leq N$; and
(iv) computer readable program code configured to ship goods if goods in stock exceed the shipment limit, $Z_i$.

9. The computer program product of claim 8 wherein $Z_i = \Sigma B_j ((i+1) \leq j \leq N)$ where $B_j$ is (safety stock corresponding to service quality $SL_j$)–(safety stock corresponding to service quality $SL_{j-1}$) and $i=1$ to $N$.

10. A method for an inventory management service provided to a user for managing an inventory of goods for a plurality of demand groups with each demand group having at least one service quality, the method comprising:
a computer processor coupled to a memory for performing the following steps:
(a) inputting a plurality of demand groups responsive to demand group information provided by a user with each demand group having at least one service quality;
(b) arranging demand groups in an order according to a service quality;
(c) determining parameters to be applied based on the demand group order comprising:
  (i) calculating for a total demand of demand groups $G_i$ to $G_N$ a safety stock corresponding to service quality $SL_i$;
  (ii) calculating for a total demand of demand groups $G_i$ to $G_N$ a safety stock corresponding to service quality $SL_{i-1}$;
  (iii) determining a safety stock $B_i$ according to the formula:

$B_i$=Safety stock corresponding to service quality $SL_i$–safety stock corresponding to service quality $SL_{i-1}$;

(iv) repeating steps (i) to (iii) for $1 \leq i \leq N$;
  (v) determining a total safety stock for all demand groups for all service qualities according to the formula:

$B_{ALL} = \Sigma B_i (1 \leq i \leq N)$; and (vi) determining a shipment limit, $Z_i$, for each group $G_i$ for $1 \leq i \leq N$ wherein $Z_i = \Sigma B_i ((i+1) \leq j \leq N)$ where $B_i$ is (safety to service quality $SL_i$)–(safety stock corresponding to service quality $SL_{i-1}$) and i=1 to N; and (d) determining an order placement of the goods and a shipment of the goods based on a shipment limit of each demand group.

11. The inventory management method of claim 10 wherein (b) comprises:
  (i) listing all demand groups into a list LG and listing all service qualities into a list LS so that each demand group has a corresponding service quality;
  (ii) determining a safety stock for a total demand of all demand groups in List LG against each service quality in List LS;
  (iii) choosing a demand group and corresponding service quality having the smallest safety stock;
  (iv) removing the demand group and corresponding service quality having the smallest safety stock from the list LG and list LS, respectively, and placing the demand group in a new list OG;
  (v) repeating steps (ii), (iii) and (iv) until all demand groups have been chosen and placed in the list OG such that the list OG lists demand groups from smallest safety stock to largest safety stock.

12. The inventory management method of claim 10 wherein (d) comprises:
  (i) receiving a new demand;
  (ii) determining to which demand group the new demand belongs;
  (iii) determining a shipment limit, $Z_i$, for each demand group $G_i$ for $1 \leq i \leq N$; and
  (iv) shipping goods if goods in stock exceed the shipment limit, $Z_i$.

13. The inventory management of claim 12 wherein $$Z_i = \Sigma B_j ((i+1) \leq j \leq N) \text{ where}$$

$B_j$ is (safety stock corresponding to service quality $SL_j$)−(safety stock corresponding to service quality $SL_{j-1}$) and i=1 to N.

* * * * *